(12) United States Patent
Matsumoto

(10) Patent No.: US 7,729,136 B2
(45) Date of Patent: Jun. 1, 2010

(54) ISOLATED DC-DC CONVERTER

(75) Inventor: Tadahiko Matsumoto, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/509,639

(22) Filed: Jul. 27, 2009

(65) Prior Publication Data

US 2009/0279327 A1 Nov. 12, 2009

Related U.S. Application Data

(63) Continuation of application No. PCT/JP2008/062822, filed on Jul. 16, 2008.

(30) Foreign Application Priority Data

Nov. 20, 2007 (JP) ............................. 2007-300591

(51) Int. Cl.
*H02M 3/335* (2006.01)
*H02M 3/24* (2006.01)

(52) U.S. Cl. ................. 363/21.08; 363/21.8; 363/21.18; 363/97

(58) Field of Classification Search ............. 363/21.01, 363/21.07–21.11, 21.15–21.18, 80, 97
See application file for complete search history.

(56) References Cited

U.S. PATENT DOCUMENTS

| 6,574,081 | B1 * | 6/2003 | Matsumoto et al. | 361/18 |
| 7,480,158 | B2 * | 1/2009 | Moromizato et al. | 363/21.06 |
| 7,596,009 | B2 * | 9/2009 | Matsumoto | 363/89 |
| 2005/0128773 | A1 * | 6/2005 | Yang et al. | 363/16 |
| 2007/0007937 | A1 | 1/2007 | Park et al. | |
| 2007/0153554 | A1 | 7/2007 | Matsumoto | |

FOREIGN PATENT DOCUMENTS

| JP | 7-213052 A | 8/1995 |
| JP | 9-65652 A | 3/1997 |

OTHER PUBLICATIONS

Official Communication issued in International Patent Application No. PCT/JP2008/062822, mailed on Oct. 14, 2008.

* cited by examiner

*Primary Examiner*—Jessica Han
(74) *Attorney, Agent, or Firm*—Keating & Bennett, LLP

(57) ABSTRACT

In an isolated DC-DC converter, an on-period control circuit generates an off-timing signal when the output voltage of an isolated DC-DC converter exceeds a reference voltage. A signal reception/power switch driving circuit causes a first switching device to be turned on based on a pulse signal for switching that is output from a PWM control circuit, and causes the first switching device to be turned off based on an off-timing signal transmitted by an off-timing signal transmission unit. A bootstrap circuit boosts a control voltage of the first switching device with the pulse signal for switching that is output from the PWM control circuit.

2 Claims, 4 Drawing Sheets

ISOLATED DC-DC CONVERTER

BACKGROUND OF THE INVENTION

1. Field of the Invention

The present invention relates to an isolated DC-DC converter having DC isolation between the input and output thereof and a circuit arranged to perform switching control of the main switching device.

2. Description of the Related Art

FIG. 1 shows a circuit diagram of an isolated switching power supply apparatus disclosed in International Publication Pamphlet No. 2007/018227. Referring to FIG. 1, terminals +Vin and −Vin are respectively the (+) input terminal and (−) input terminal for a DC input power supply. Terminals +Vout and −Vout are respectively the (+) output terminal and (−) output terminal.

This isolated switching power supply apparatus includes an input smoothing capacitor C1, a main transformer T1 having a primary winding n1 and a secondary winding n2, a first switching device Q1 for switching an input voltage applied to the primary winding n1 of the main transformer T1 from the input DC power supply, a square wave oscillator circuit 1 for generating a square wave signal supplied to the gate of the first switching device Q1, a signal reception/power switch driving circuit 2, a rectification side synchronous rectifier Q2 and a commutation side synchronous rectifier Q3 for synchronously rectifying a voltage induced in the secondary winding n2 of the main transformer T1, a synchronous rectifier driving circuit 3 for driving both rectifiers, an off-timing signal transmission circuit 4, a ramp generator circuit 5, an on-period control circuit 6, a choke coil transformer L1, and an output smoothing capacitor C2.

The isolated switching power supply apparatus also includes a pulse transformer T2 and a diode D5 for transmitting an output signal of the off-timing signal transmission circuit 4 to the signal reception/power switch driving circuit 2 in an isolated state.

The square wave oscillator circuit 1 is a multivibrator including inverters IC2 and IC3, and a CR circuit. The signal reception/power switch driving circuit 2 includes an AND gate IC4, a switching device Q4, a resistor R8, and a diode D9.

The synchronous rectifier driving circuit 3 includes a rectification side synchronous rectifier driving terminal FRD and a commutation side synchronous rectifier driving terminal FLY. The off-timing signal transmission circuit 4 includes an AND gate IC5 and a capacitor C7. An on-period control circuit 6 includes a comparator IC1 and a reference power source Vref.

The ramp generator circuit 5 generates a ramp voltage signal using the choke coil transformer L1 and a CR circuit, and inputs the signal to the comparator IC1 of the on-period control circuit 6.

The switching power supply apparatus shown in FIG. 1 constitutes a resonance reset forward converter, in which an input DC power supplied across +Vin and −Vin is, after being smoothed by the input smoothing capacitor C1, converted into an AC power through switching performed by the first switching device Q1 (primary power switch). This AC power is transmitted from the primary winding n1 to the secondary winding n2 of the main transformer T1, and converted back into a DC power, after being rectified by the rectification side synchronous rectifier Q2 and the commutation side synchronous rectifier Q3, and being smoothed by the choke coil transformer L1 and the output smoothing capacitor C2.

The comparator IC1 of the on-period control circuit 6 compares the output voltage at the (+) input and a divided voltage of the reference power source Vref at the (−) input. A ramp wave generated by the ramp generator circuit 5 is superimposed on the divided voltage of the reference power source Vref at the (−) input and gradually diminishes during the on-period of the first switching device Q1. When the (+) input voltage becomes higher than the (−) input voltage during the on-period due to the gradual decrease in the (−) input, the output voltage level of the IC1 changes from an L level to an H level.

The AND gate IC5 keeps detecting the on-period of the first switching device Q1 through the choke coil transformer L1, and when the output voltage of the IC1 changes from an L level to an H level during the on-period of the first switching device Q1, outputs an off-timing signal via the capacitor C7 and transmits the signal from the secondary winding n2 to the primary winding n1 of the pulse transformer T2. At this time, the diode D5 resets the pulse transformer T2 excited by the transmission of the off-timing signal.

The square wave oscillator circuit 1 outputs a square wave having a maximum on-duty ratio. Since the output of the inverter IC2 has a timing opposite that of the square wave oscillator circuit 1, the output capacitor of the switching device Q4 is charged via the diode D9 and the resistor R8 during the off-period of the square wave oscillator circuit, whereby the drain voltage of the switching device Q4 changes to an H level. The AND gate IC4 becomes an H level when both of the output voltage of the square wave oscillator circuit 1 and the drain voltage of the switching device Q4 become an H level. Hence, when the output voltage of the square wave oscillator circuit changes from an L level to an H level, the output of the AND gate IC4 also changes from an L level to an H level, whereby the first switching device Q1 is turned on.

When an off-timing signal is input to the gate of Q4 via the pulse transformer T2 during an on-period of Q1, Q4 is turned on and the charge stored in the output capacitor is discharged. Thereby the drain voltage of Q4 changes from an H level to an L level, and the output of IC4 also changes from an H level to an L level, and hence the first switching device Q1 is turned off.

On the basis of the above-described operation, the signal reception/power switch driving circuit 2 determines the off timing of the first switching device Q1 in synchronization with the turn-on timing of the square wave oscillator circuit 1, and determines the off timing of the first switching device Q1 in synchronization with the turn-off timing, whereby PWM control is performed and the output voltage of the switching power supply is stabilized. Hence, very fast responsiveness is realized without a phase delay caused by a photocoupler or an error amplifier.

In the known isolated switching power supply apparatus without a photocoupler or an error amplifier shown in FIG. 1, the square wave oscillator circuit 1 includes an inverter, and the signal reception/power switch driving circuit 2 includes an AND gate. Since the maximum rated absolute voltage of general high-speed logic ICs is usually approximately 7 V, the gate driving voltage of the first switching device Q1 is limited to a voltage lower than that voltage. To realize a sufficient gate driving voltage, a MOSFET which can drive the first switching device Q1 at a logic level is required; however, a MOSFET which allows logic-level driving with a withstand drain voltage over 100 V is not easily available. In addition, the gate driving power is not satisfactory for a high-power switching power supply which requires a high input capacity for the first switching device Q1.

For these reasons, the known isolated switching power supply configuration shown in FIG. 1 is not suitable for a high-input-voltage and high-power switching power supply.

A possible solution may be a configuration having a two-stage Darlington connection of FETs in which a high-speed logic gate IC uses an output thereof to drive a low-withstand-voltage FET, which in turn drives a high-withstand-voltage FET. Alternatively, an IC for driving a high-withstand-voltage FET may be used which can raise the logic output of approximately 5 V to an output of approximately 8-10 V.

These configurations, however, disadvantageously result in high cost and require high-power resistors resulting in low circuit efficiency.

SUMMARY OF THE INVENTION

Preferred embodiments of the present invention provide an isolated DC-DC converter which solves the above problems and achieves low cost, high efficiency, high-voltage input, and large capacity.

According to a preferred embodiment of the present invention, an isolated DC-DC converter includes: a main transformer having at least a primary winding and a secondary winding; a first switching device arranged to switch an input voltage applied from an input power supply to the primary winding of the main transformer; a PWM control circuit arranged to output a pulse for switching having an on-duty ratio in accordance with an input voltage of a feedback signal input terminal; and a rectifying and smoothing circuit arranged to rectify and smooth a voltage induced in the secondary winding of the main transformer. The input voltage of the feedback signal input terminal of the PWM control circuit is set such that the on-duty ratio of the pulse signal for switching becomes a maximum or in the vicinity of a maximum, and the PWM control circuit includes: an on-period control circuit arranged to detect an output voltage of the rectifying and smoothing circuit and to generate, when the output voltage exceeds a reference voltage, an off-timing signal which is a timing signal for causing the first switching device to be turned off; a pulse signal transmission unit arranged to transmit the off-timing signal to a primary side in an isolated state; a signal reception/power switch driving circuit arranged to cause the first switching device to be turned on based on the pulse signal for switching that is output from the PWM control circuit and to cause the first switching device to be turned off based on the off-timing signal transmitted by the pulse signal transmission unit; and a booster circuit arranged to boost a power supply voltage for the signal reception/power switch driving circuit with the pulse signal for switching that is output from the PWM control circuit.

Using this configuration, the first switching device Q1 is turned on by the pulse signal for switching from the PWM control circuit, and turned off in synchronization with the off-timing signal output from the on-period control circuit, thereby realizing PWM control. Hence, very fast responsiveness is realized since there is no phase delay caused by a conventionally used photocoupler or error amplifier. Furthermore, a switching loss is reduced by causing the power supply voltage for the control circuit boosted by the booster circuit to drive the first switching device Q1, thereby driving the first switching device Q1 with a sufficient driving voltage and current.

The main transformer preferably includes a third winding, and the isolated DC-DC converter preferably includes a non-isolated DC-DC converter arranged to generate a power supply voltage for a control circuit, the non-isolated converter having a rectifying and smoothing circuit arranged to rectify and smooth a voltage induced in the third winding of the main transformer and a second switching device arranged to switch an output voltage of the rectifying and smoothing circuit; and a feedback voltage control circuit arranged to detect the power supply voltage for the control circuit and to provide a voltage proportional to the power supply voltage for the control circuit to the feedback signal input terminal of the PWM control circuit such that a relation Ton(PWM)>Ton(Q1) is satisfied, wherein an on duration of the pulse signal for switching that is output from the PWM control circuit is Ton(PWM), and an on duration of the first switching device is Ton(Q1).

Using this configuration, a stabilized power supply voltage for the control circuit can be generated by the internal converter (isolated DC-DC converter). In addition, since the on-duty ratio of the pulse signal for switching that is output from the PWM control circuit does not become unnecessarily large, power consumption by the PWM control circuit is decreased, whereby a generally highly efficient isolated DC-DC converter can be configured.

According to a preferred embodiment of the present invention, the first switching device Q1 is turned on by the pulse signal for switching that is output from the PWM control circuit, and turned off in synchronization with the off-timing signal output from the on-period control circuit, thereby realizing PWM control. Hence, very fast responsiveness is realized since there is no phase delay caused by a conventionally used photocoupler or error amplifier.

Furthermore, a switching loss is reduced by causing the power supply voltage for the control circuit boosted by the booster circuit to drive the first switching device Q1, thereby driving the first switching device Q1 with a sufficient driving voltage and current.

In addition, since a PWM control IC can be used as the circuit arranged to generate a pulse signal for switching, it becomes possible to utilize functions included in the PWM control IC as is, such as an under voltage lockout (UVLO) function, an over current protection (OCP) function, and an over temperature protection (OTP) function, whereby a higher integration density and hence a smaller switching power supply are realized as compared to a control circuit configuration using discrete components.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
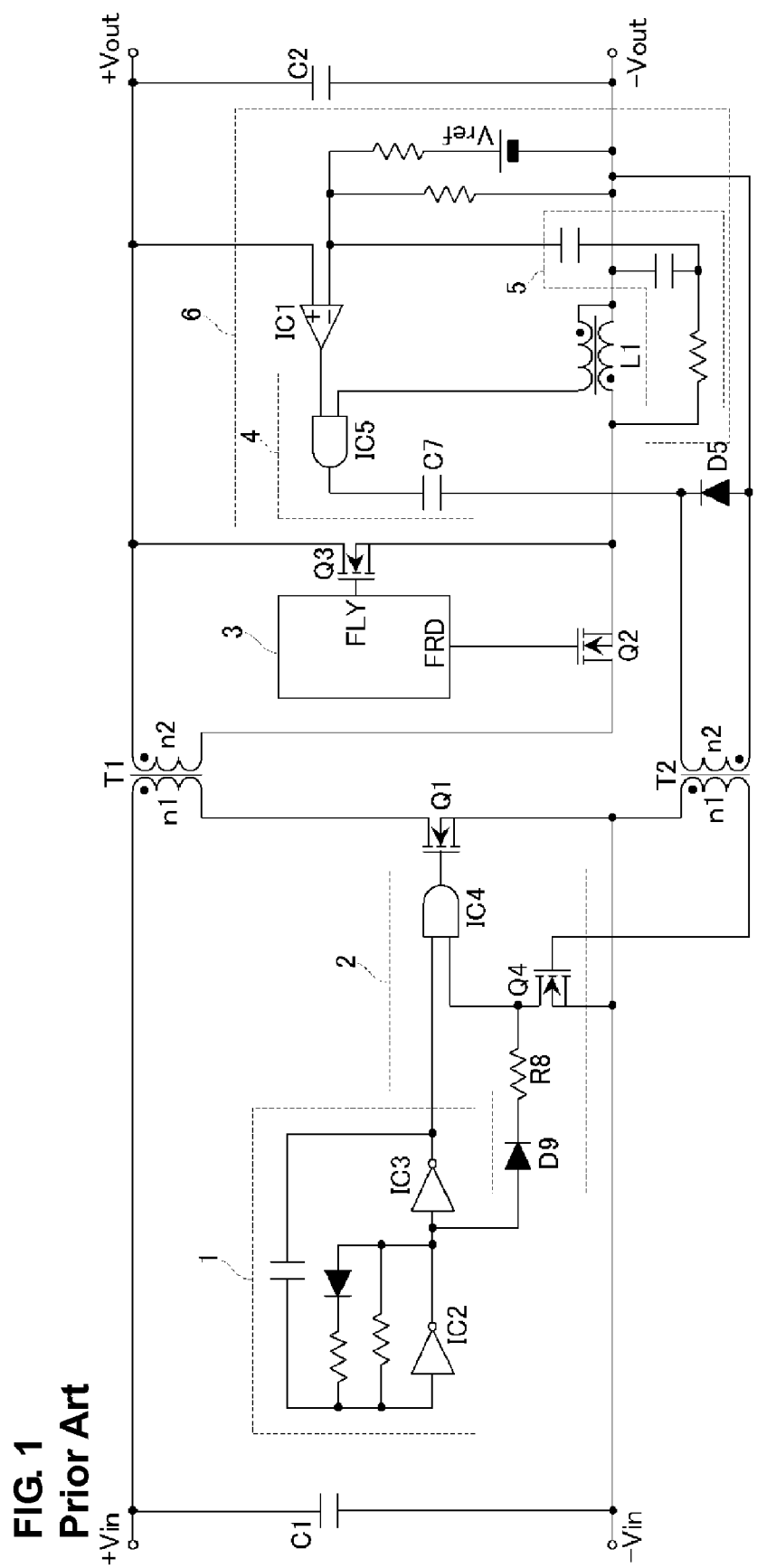
FIG. 1 is a circuit diagram of an isolated switching power supply apparatus shown in International Publication Pamphlet No. 2007/018227.
Figure 2:
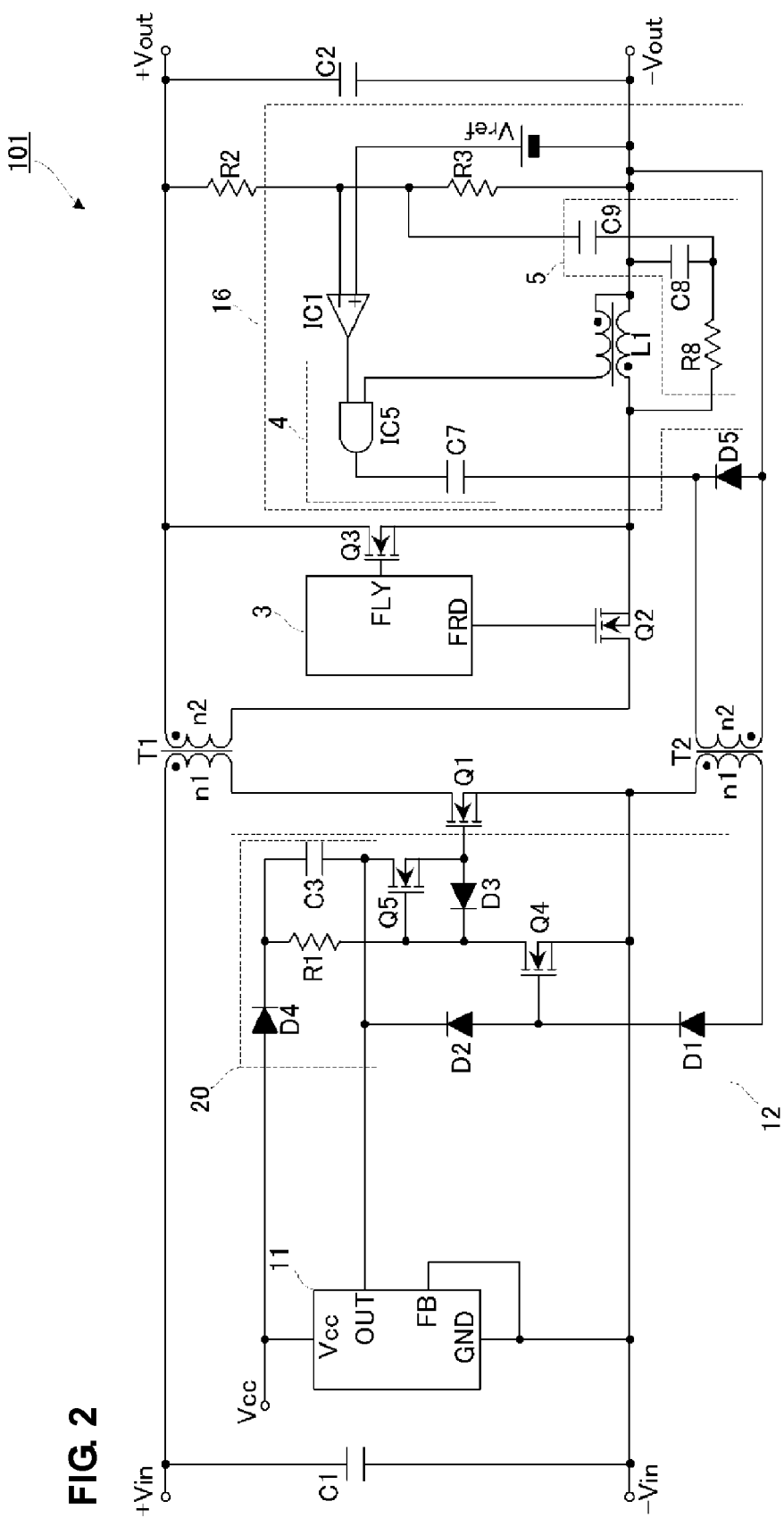
FIG. 2 is a circuit diagram of an isolated DC-DC converter according to a first preferred embodiment of the present invention.
Figure 3:
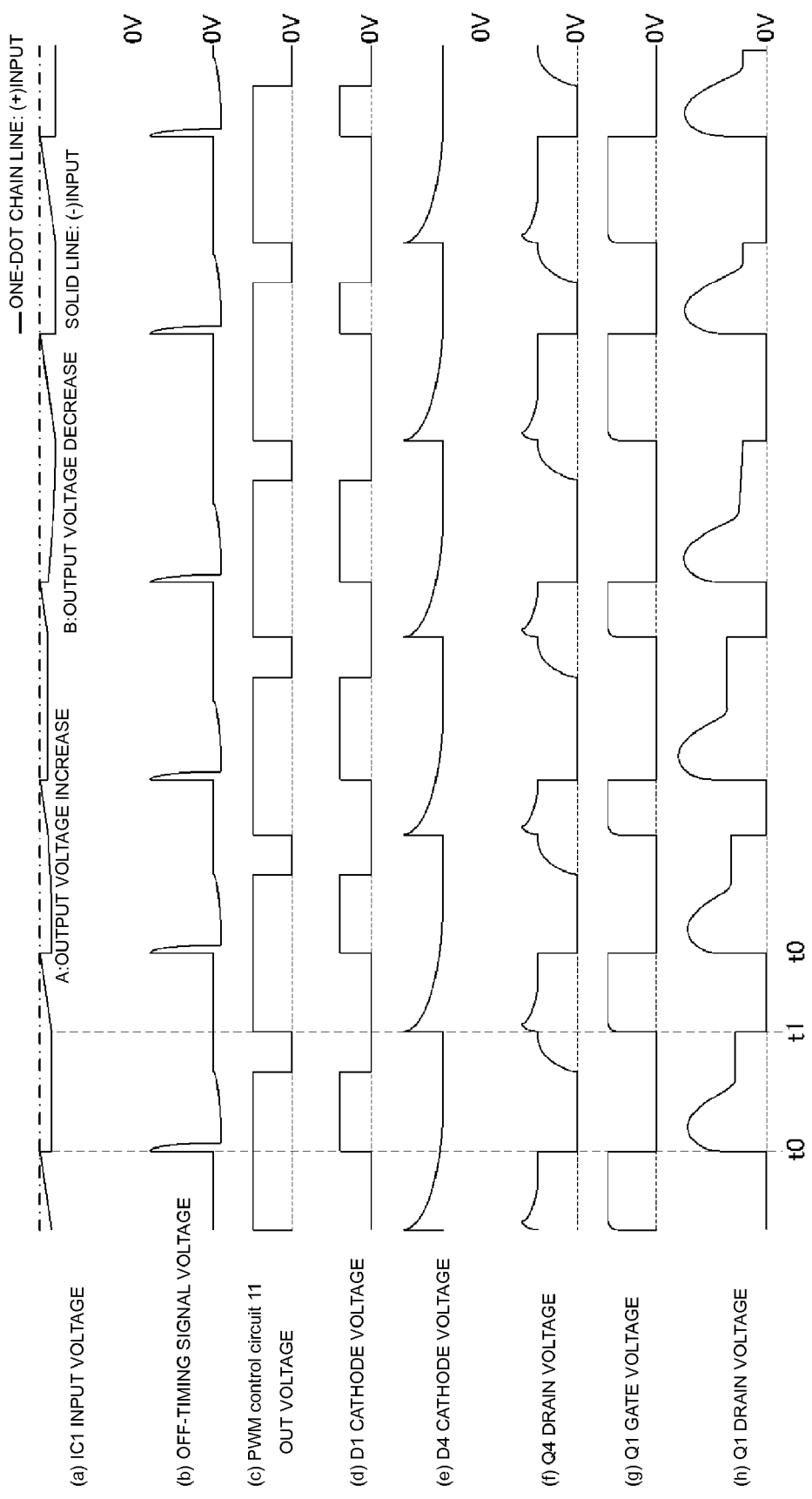
FIG. 3 illustrates respective waveforms at various portions of the first preferred embodiment of the present invention.

FIG. 2 shows a circuit diagram of an isolated DC-DC converter according to a first preferred embodiment, and FIG. 3 shows respective waveforms at various portions thereof.

Referring to FIG. 2, terminals +Vin and −Vin are respectively the (+) input terminal and (−) input terminal for a DC input power supply. Terminals +Vout and −Vout are respectively the (+) output terminal and (−) output terminal.

The isolated DC-DC converter 101 includes an input smoothing capacitor C1, a main transformer T1 having a primary winding n1 and a secondary winding n2, a first switching device Q1 arranged to switch an input voltage applied to the primary winding n1 of the main transformer T1 from the input DC power supply, a PWM control circuit 11 arranged to generate a pulse signal for switching supplied to the gate of the first switching device Q1, a signal reception/power switch driving circuit 12, a rectification side synchronous rectifier Q2 and a commutation side synchronous rectifier Q3 arranged to rectify a voltage induced in the secondary winding n2 of the main transformer T1, a synchronous rectifier driving circuit 3 arranged to drive both rectifiers, an off-timing signal transmission circuit 4, a ramp generator circuit 5, an on-period control circuit 16, a choke coil transformer L1, and an output smoothing capacitor C2.

The isolated DC-DC converter 101 also includes a pulse transformer T2 and a diode D5 arranged to transmit an output signal of the off-timing signal transmission circuit 4 to the signal reception/power switch driving circuit 2 in an isolated state.

The PWM control circuit 11 is a PWM control IC arranged to generate a pulse signal arranged to switch having an on-duty ratio in accordance with an input voltage of a feedback signal input terminal FB. The input voltage of the feedback signal input terminal FB is set to 0 V (ground potential of the −Vin terminal). Hence, the PWM control circuit 11 outputs a pulse signal arranged to switch (square-wave signal) having a maximum possible on-duty ratio.

The signal reception/power switch driving circuit 12 is provided with a bootstrap circuit 20 including a diode D4, a resistor R1, and a capacitor C3. The bootstrap circuit 20 corresponds to a "booster circuit" according to a preferred embodiment of the present invention.

A diode D3 and a switching device Q5 are provided between the gate of the first switching device Q1 and the bootstrap circuit 20.

A switching device Q4 is provided between the first switching device Q1 and the ground via the diode D3.

One end of the primary winding n1 of the pulse transformer T2 is grounded and the other end is connected to the gate of Q4 via a diode D1. Further, a diode D2 is connected between the switching device Q4 and an OUT terminal of the PWM control circuit 11.

The circuit connected to the primary side of the pulse transformer T2 and the bootstrap circuit 20 preferably define the signal reception/power switch driving circuit 12.

The isolated DC-DC converter 101 shown in FIG. 2 operates as follows.

During steady operation, a pulse signal for switching (square-wave signal) having a maximum on-duty ratio is always output from the OUT terminal of the PWM control circuit 11 (see (c) of FIG. 3).

In the bootstrap circuit 20, when the OUT output of the PWM control circuit 11 is an L level, the capacitor C3 is charged through the path Vcc→D4→C3→the OUT output of the PWM control circuit 11. This charge voltage is (Vcc—a forward voltage drop of the diode D4). Later, when the OUT output of the PWM control circuit 11 becomes an H level, voltage Vcc+the charged voltage of the capacitor C3 is applied to the gate of Q5.

Hence, when the OUT terminal voltage of the PWM control circuit 11 changes from an L level to an H level at time t1, the input capacitor of the first switching device Q1 is charged via the switching device Q5, and a voltage which is several volts higher than the Vcc voltage (10 V) is applied to the gate of Q5 due to the above-described operation of the bootstrap circuit 20. Consequently, a voltage drop due to the presence of a threshold voltage between G and S of Q5 is not generated, and the Q1 gate voltage increases up to a voltage which is approximately the same as that of the OUT terminal, whereby the first switching device Q1 is turned on (see FIG. 3, (e), (f), and (g)).

When an off-timing signal is transmitted via the pulse transformer T2 at t0 during the on-period of the first switching device Q1, the input capacitor of the switching device Q4 is charged via the diode D1, whereby Q4 is turned on (see (b) of FIG. 3). When Q4 is turned on, the switching device Q5 is turned off, the charging current from the OUT terminal of the PWM control circuit 11 to the gate of the first switching device Q1 is cut off, and the charge in the input capacitor of Q1 is discharged via the diode D3, whereby the first switching device Q1 is turned off. The input capacitor of the switching device Q4 is kept in a state of being charged until the OUT terminal voltage changes from an H level to an L level the next time. Hence, the drain voltage of the switching device Q4 works as a mask signal for the first switching device Q1, and during the on-period of the mask signal, the off state of the first switching device Q1 is maintained (see (d) and (h) of FIG. 3).

Later, when the OUT terminal voltage changes from an H level to an L level, the input capacitor of the switching device Q4 is discharged to the OUT terminal via the diode D2, whereby the switching device Q4 is turned off.

The synchronous rectifier driving circuit 3 includes a rectification side synchronous rectifier driving terminal FRD and a commutation side synchronous rectifier driving terminal FLY. The off-timing signal transmission circuit 4 includes an AND gate IC5 and a capacitor C7. An on-period control circuit 16 includes a comparator IC1, a reference power source Vref arranged to generate a reference voltage, and voltage divider resistors R2 and R3.

The ramp generator 5 generates a ramp voltage signal using the choke coil transformer L1 and the CR circuit, and inputs the signal to the comparator IC1 of the on-period control circuit 6.

The isolated DC-DC converter 101 shown in FIG. 2 constitutes a resonance reset forward converter, in which an input DC power supplied across +Vin and −Vin is, after being smoothed by the input smoothing capacitor C1, converted into an AC power through switching performed by the first switching device Q1. This AC power is transmitted from the primary winding n1 to the secondary winding n2 of the main transformer T1, and converted back into a DC power, after being rectified by the rectification side synchronous rectifier Q2 and the commutation side synchronous rectifier Q3, and being smoothed by the choke coil transformer L1 and the output smoothing capacitor C2.

The ramp generator circuit 5, including capacitors C8 and C9 and a resistor R8, receives a voltage across both ends of the first winding of the choke coil transformer L1, and generates a ramp wave in synchronization with the rise of the pulse signal for switching that is output by the PWM control circuit 11.

The comparator IC1 of the on-period control circuit 6 compares an output voltage divided by the resistors R2 and R3 and the voltage of the reference power source Vref. A ramp wave generated by the ramp generator circuit 5 is superimposed on the divided voltage of the output voltage input to the (−) terminal of the comparator IC1, and gradually increases during the on-period of the first switching device Q1. When the (−) input becomes higher than the (+) input during the on-period due to the gradual increase in the (−) terminal input voltage, the output voltage of the IC1 changes from an H level to an L level.

The AND gate IC5 of the off-timing signal transmission circuit 4 receives the second winding voltage of the choke coil transformer L1 and the output voltage of the comparator IC1, and when the output voltage of the IC1 changes from an H level to an L level during the on-period of the first switching device Q1, outputs an off-timing signal via the capacitor C7.

This off-timing signal is transmitted from the secondary winding n2 to the primary winding n1 of the pulse transformer T2. The pulse transformer T2 preferably corresponds to a "pulse signal transmission unit" according to a preferred embodiment of the present invention. At this time, the diode D5 resets the pulse transformer T2 excited by the transmission of the off-timing signal (see FIG. 3B).

As described above, in the signal reception/power switch driving circuit 12, the on timing of the first switching device Q1 is determined in synchronization with the rise timing of the OUT terminal of the PWM control circuit 11, and the off timing of the first switching device Q1 is determined in synchronization with the off-timing signal. Thereby PWM control is performed and the output voltage of the isolated DC-DC converter 101 is stabilized.

When the output voltage increases at point A in FIG. 3, the timing of a change from an H level to an L level of the comparator IC1 is advanced, and the transmission timing of an off-timing signal is advanced, whereby the on-duty ratio of the first switching device Q1 decreases. On the other hand, when the output voltage decreases at point B in FIG. 3, the timing of a change from an L level to an H level of the comparator IC1 is delayed, and the transmission timing of an off-timing signal is delayed, whereby the on-duty ratio of the first switching device Q1 increases.

Note that the PWM control circuit 11 preferably includes a PWM control IC, and functions included therein are utilized. These functions include an under voltage lockout (UVLO) function, an over current protection (OCP) function, and an over temperature protection (OTP) function. In other words, by inputting a voltage proportional to the input voltage, such as a resistor-divided voltage of the input voltage, to the PWM control circuit 11, an alarm signal is output through an operation of the UVLO function when the input voltage goes below a predetermined voltage. Likewise, by inputting a detection signal regarding a primary or secondary current to the PWM control circuit 11, when an over-current state is entered, a further increase in the current is suppressed through an operation of the OCP function. Further, by inputting a heat detection signal to the PWM control circuit 11, when an over-heat state is entered, a further increase in the temperature is suppressed through an operation of the OTP function.

In this manner, very fast responsiveness is realized since there is no phase delay caused by a conventionally used photocoupler or error amplifier. Furthermore, a switching loss is reduced by providing the bootstrap circuit 20 thereby driving the first switching device Q1 with a sufficient driving voltage and current.

In addition, since a PWM control IC is used as the circuit arranged to generate a pulse signal for switching (square-wave signal), a higher integration density and hence a smaller switching power supply are realized than in a control circuit configuration using discrete components, by utilizing functions included in the PWM control IC, such as an under voltage lockout (UVLO) function, an over current protection (OCP) function, and an over temperature protection (OTP) function.

Second Preferred Embodiment

Figure 4:
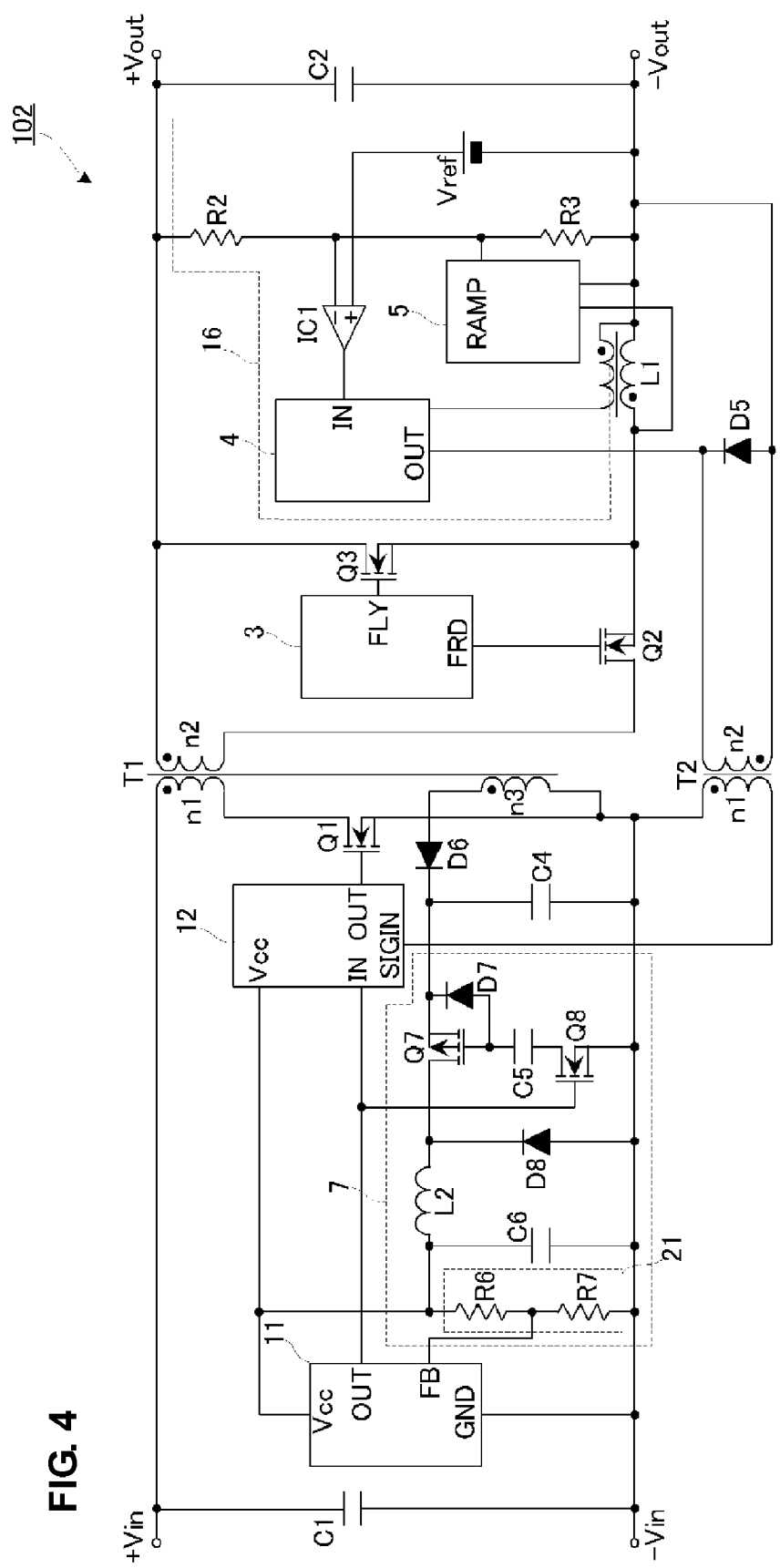
FIG. 4 is a circuit diagram of an isolated DC-DC converter according to a second preferred embodiment of the present invention.

FIG. 4 shows a circuit diagram of an isolated DC-DC converter 102 according to a second preferred embodiment.

What is different from the isolated DC-DC converter 101 according to the first preferred embodiment shown in FIG. 2 is that a main transformer T1 includes a third winding n3, and a back converter 7 (non-isolated DC-DC converter) arranged to generate a voltage for a control circuit power supply Vcc on the basis of the electromotive force of the third winding is provided, and that a voltage proportional to the output voltage of the back converter 7 is input to a feedback signal input terminal FB of a PWM control circuit 11.

A signal reception/power switch driving circuit 12, an off-timing signal transmission circuit 4, a ramp generator circuit 5, and an on-period control circuit 16 are similar to those in the isolated DC-DC converter 101 of the first preferred embodiment shown in FIG. 2, and are represented by respective blocks in FIG. 4.

The back converter 7 operates using, as its power supply, the output of the third winding n3 after being rectified by a diode D6 and smoothed by a capacitor C4.

When a switching device Q8, which is an N-channel MOSFET, is driven by a pulse signal for switching that is output from the OUT terminal of the PWM control circuit 11, an inverted signal of the signal for switching appears at the drain of the switching device Q8. This inverted signal, after the DC level thereof is changed by a capacitor C5 and a diode D7, is supplied to the gate of a switching device Q7, which is a P-channel MOSFET.

The switching device Q7 is turned on when the pulse signal for switching is at an H level and turned off when the pulse signal for switching is at an L level. When the pulse signal for switching is at an H level and the switching device Q7 is turned on, a current flows along the path: the capacitor C4→the switching device Q7→a choke coil L2→a capacitor C6. When the pulse signal for switching is at an L level and the switching device Q7 is turned off, a current flows along the path: a diode D8→the choke coil L2→the capacitor C6. Thus, a voltage proportional to the on-duty ratio of the pulse signal for switching is output from the back converter 7.

The output voltage of the back converter 7 is divided by resistors R6 and R7 making up a feedback voltage control circuit 21 and input to the feedback signal input terminal FB of the PWM control circuit 11. Hence, PWM control is performed on the pulse signal for switching, and the output voltage (voltage of the control circuit power supply Vcc) of the back converter 7 is stabilized and supplied to the PWM control circuit 11, the signal reception/power switch driving circuit 12, and other control circuits.

However, since a portion of the pulse signal for switching subsequent to the off-timing signal is cut off, the on-duty ratio of the pulse signal for switching is set so as to satisfy the following condition.

That is, by letting the on duration of the pulse signal for switching that is output from the PWM control circuit 11 be Ton (PWM) and the on duration of the first switching device (Q1) be Ton(Q1), the following relation is preferably satisfied:

$$\text{Ton}(PWM) > \text{Ton}(Q1) \quad (1)$$

By keeping the relation (1) always satisfied, the driving signal for the first switching device Q1 is formed and the PWM control is properly performed. Consequently stabilization control of the output voltage of the isolated DC-DC converter 102 can be performed.

In this manner, very fast responsiveness is realized since there is no phase delay caused by a conventionally used photocoupler or error amplifier. Furthermore, a switching loss is reduced by providing the bootstrap circuit 20 thereby driving the first switching device Q1 with a sufficient driving voltage and current.

In addition, even in an application in which the output voltage of the isolated DC-DC converter 102 is externally adjusted or modified, the voltage of the control circuit power supply Vcc is not affected by the output voltage. Hence, the control circuit voltage is always stabilized with a low loss, advantageously allowing for high efficiency.

Furthermore, the on-duty ratio of the pulse signal for switching that is output from the PWM control circuit 11 does not become unnecessarily large. Hence, power consumption by the PWM control circuit 11 is decreased, whereby a generally highly efficient isolated DC-DC converter can be configured.

Thus, according to the first and second preferred embodiments, very fast responsiveness is realized since there is no phase delay caused by a conventionally used photocoupler or error amplifier. Furthermore, a switching loss is reduced by providing the bootstrap circuit 20 thereby driving the first switching device Q1 with a sufficient driving voltage and current.

In addition, by using a PWM control IC having a current detection terminal, the integration density is increased, resulting in reduction in size, weight and cost of the entire isolated DC-DC converter.

In the preferred embodiments described above, a forward converter configuration is preferably used as the power conversion circuit; however, various circuit topologies may be applied to the isolated switching power conversion circuit. For example, a single end type, double-end push-pull, half bridge, or full bridge converters can be used, however, the present invention is not so limited. A current mode PWM control IC for double ends usually includes an internal frequency divider circuit. Hence, by using a circuit configuration in which an off-timing signal is input to a current detection terminal as in the second preferred embodiment, it is no longer necessary to provide a frequency divider circuit outside of the PWM control IC, whereby the circuit configuration can be simplified.

Further, the pulse transformer T2 may be formed as a composite magnetic portion in which the same core is shared with the main transformer T1 or the choke coil transformer L1. This allows for reduction in size and cost of the elements and components. Such composite magnetic portions may employ the structure and forming method disclosed in Japanese Unexamined Patent Application Publication No. 2000-260639, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated DC-DC converter, comprising:
   a main transformer including at least a primary winding and a secondary winding;
   a first switching device arranged to switch an input voltage applied from an input power supply to the primary winding of the main transformer;
   a PWM control circuit arranged to output a pulse for switching having an on-duty ratio in accordance with an input voltage of a feedback signal input terminal; and
   a rectifying and smoothing circuit arranged to rectify and smooth a voltage induced in the secondary winding of the main transformer; wherein
   the input voltage of the feedback signal input terminal of the PWM control circuit is set such that the on-duty ratio of the pulse signal for switching becomes a maximum or approximately a maximum, and the PWM control circuit includes:
   an on-period control circuit arranged to detect an output voltage of the rectifying and smoothing circuit and to generate, when the output voltage exceeds a reference voltage, an off-timing signal which is a timing signal for causing the first switching device to be turned off;
   a pulse signal transmission unit arranged to transmit the off-timing signal to a primary side in an isolated state;
   a signal reception/power switch driving circuit arranged to cause the first switching device to be turned on based on the pulse signal for switching that is output from the PWM control circuit and to cause the first switching device to be turned off based on the off-timing signal transmitted by the pulse signal transmission unit; and
   a booster circuit arranged to boost a power supply voltage for the signal reception/power switch driving circuit with the pulse signal for switching that is output from the PWM control circuit.

2. The isolated DC-DC converter according to claim 1, wherein the main transformer includes a third winding, and the isolated DC-DC converter includes:
   a non-isolated DC-DC converter arranged to generate a power supply voltage for a control circuit, the non-isolated converter having a rectifying and smoothing circuit arranged to rectify and smooth a voltage induced in the third winding of the main transformer and a second switching device arranged to switch an output voltage of the rectifying and smoothing circuit; and
   a feedback voltage control circuit arranged to detect the power supply voltage for the control circuit and providing a voltage proportional to the power supply voltage for the control circuit to the feedback signal input terminal of the PWM control circuit such that a relation Ton(PWM)>Ton(Q1) is satisfied, wherein an on duration of the pulse signal for switching that is output from the PWM control circuit is Ton(PWM), and an on duration of the first switching device is Ton(Q1).

* * * * *